United States Patent
Jakob (10) Patent No.: US 8,684,170 B2
(45) Date of Patent: Apr. 1, 2014

(54) JUNCTION DEVICE FOR CONVEYOR BELTS (75) Inventor: Horst Jakob, Deaux (FR)

(73) Assignee: Aser, Saint-Chamond (FR)

( * ) Notice: Subject to any disclaimer, the term of this patent is extended or adjusted under 35 U.S.C. 154(b) by 867 days.

(21) Appl. No.: 12/678,788

(22) PCT Filed: Sep. 19, 2008

(86) PCT No.: PCT/FR2008/001315
§ 371 (c)(1),
(2), (4) Date: Aug. 18, 2010

(87) PCT Pub. No.: WO2009/071772
PCT Pub. Date: Jun. 11, 2009

(65) Prior Publication Data
US 2012/0090965 A1  Apr. 19, 2012

(30) Foreign Application Priority Data

Sep. 19, 2007 (FR) ...................... 07 06619

(51) Int. Cl.
*B65G 17/00* (2006.01)

(52) U.S. Cl.
USPC .................................... 198/844.2

(58) Field of Classification Search
USPC ......................... 198/844.02, 844.2
See application file for complete search history.

(56) References Cited

U.S. PATENT DOCUMENTS

| | | | |
|---|---|---|---|
| 3,668,742 A | 6/1972 | Bartmann | |
| 4,193,554 A | 3/1980 | Ansen et al. | |
| 4,344,209 A * | 8/1982 | Harwood | 24/31 R |
| 5,048,675 A | 9/1991 | Nadalutti | |
| 5,542,527 A | 8/1996 | Jakob | |
| 5,573,470 A | 11/1996 | Jakob | |
| 5,669,114 A | 9/1997 | Jakob | |
| 5,669,115 A | 9/1997 | Sulzle | |
| 5,724,706 A | 3/1998 | Jakob | |
| 5,733,086 A | 3/1998 | Jakob | |
| 5,839,571 A | 11/1998 | Jakob | |
| 6,053,308 A * | 4/2000 | Vogrig et al. | 198/844.2 |
| 6,370,739 B1 | 4/2002 | Jakob | |
| 6,374,462 B1 | 4/2002 | Jakob | |
| 6,601,698 B2 | 8/2003 | Jakob | |
| 6,860,385 B2 | 3/2005 | Jakob et al. | |
| 7,077,263 B1 * | 7/2006 | Richardson et al. | 198/844.2 |

(Continued)

FOREIGN PATENT DOCUMENTS

| | | |
|---|---|---|
| EP | 0 752 542 | 1/1997 |
| FR | 2 792 050 | 10/2000 |
| GB | 114129 | 3/1918 |
| GB | 188090 | 11/1922 |

*Primary Examiner* — Joseph Dillon, Jr.
(74) *Attorney, Agent, or Firm* — Harness, Dickey & Pierce, P.L.C.

(57) ABSTRACT

The proposed device comprises chain links alternately connected to upper fastening plates and to lower fastening plates. These plates comprise fastening claws of which some are arranged on the front and/or rear edges of the plates and others inside the surface of the plates. Stops are provided for blocking the chain links along the edge of the end of a conveyor belt. Another series of similar chain links are placed against the other end of the conveyor belt. The two series of chain links and plates are braced against the upper and lower sides of the respective conveyor belt ends, the claws fastening them to these ends. A connecting rod is then fitted into the chain links of the two pre-interleaved series, bringing together the conveyor belt ends in the process.

13 Claims, 6 Drawing Sheets

(56) References Cited

U.S. PATENT DOCUMENTS

| | | | |
|---|---|---|---|
| 7,762,390 B2 * | 7/2010 | Suelzle | 198/844.2 |
| 2002/0134652 A1 | 9/2002 | Jakob | |
| 2003/0146072 A1 * | 8/2003 | Rubino et al. | 198/844.2 |
| 2003/0150698 A1 * | 8/2003 | Herold | 198/844.2 |
| 2003/0192768 A1 * | 10/2003 | Molinaro et al. | 198/502.1 |
| 2006/0151303 A1 * | 7/2006 | Motoda | 198/844.2 |
| 2008/0207370 A1 | 8/2008 | Jakob | |
| 2012/0018285 A1 * | 1/2012 | Herold | 198/844.2 |

* cited by examiner

JUNCTION DEVICE FOR CONVEYOR BELTS

CROSS-REFERENCE TO RELATED APPLICATIONS

This application is a National Phase Entry of International Application No. PCT/FR2008/001315, filed on Sep. 19, 2008, which claims priority to French application Ser. No. 07/06619, filed on Sep. 19, 2007, both of which are incorporated by reference herein.

BACKGROUND AND SUMMARY

Junctions of ends of continuous belts, also called conveyor belts, transfer conveyors, endless belts, belts, etc, are well-known for various applications, i.e. in mines, public works, the food industry and many other fields. Such end junctions are of two main types: direct junctions by gluing or curing the ends of the conveyor belts prepared for this purpose, and the junctions using devices added at each one of the two ends of the belt either with clamps, rivets, screws or with claws or hooks joined to the junction devices. Such junction devices include series of U-shaped staples including chain links or lugs which are positioned astride on each one of the ends of the belt, which are simply cut transversally with respect to the belt, perpendicularly to the longitudinal direction or travel direction thereof. The chain links of one of the series of staples fastened at one end of the belt are interleaved with the chain links of the other series of staples fastened on the second end of the belt, a connecting and articulation rod being alternately introduced into a chain link of the first series and a chain link of the second series and so on up to the last chain link. It should be understood that such an assembly then operates as a hinge.

The staples each include an upper plate and a lower plate running on from one or several chain links, generally two chain links, such plates being used for fastening the chain links as mentioned above using clamps, rivets or other similar means. They are delivered in divisible belts forming series of juxtaposed staples connected by the metal of the juxtaposed plates, with the metal being provided with a groove, which makes it possible to take the number of staples required at the time of the mounting from a belt including a large number of staples by separating them.

The other kind of staples for the junction of conveyor belts is that of staples with claws. Originally, individual staples were used, which were made of metal wire, bent in a U shape and including bent points analogous to the staples called "hog ring" staples used, for example, when manufacturing bed bases, spring seats and spring mattresses. Such staples were used, for example, to make relatively thin belt junctions or conveyor belt junctions. In order to avoid a conflict between the points fixing such staples overlapping with respect to the end of the conveyor belts, the U-shaped folding was shifted which resulted in branches with different lengths, the claws of which could not conflict when bracing the staples on the ends of the conveyor belts. The staples of this type, which are subsequently called generation I staples, are described for example in several prior documents relating to improvements to the first-generation staples, which are considered as known as from 1935: refer to the German patent 648 538 (Paul Wever) filed on 9 Aug. 1935, the French patent 2 055 625 filed on 24 Jul. 1970, with a conventional priority of the application of the German utility model G 69 29 255.3 filed on 24 Jul. 1967 (Thomas Joseph Heimbach GmbH), the U.S. Pat. No. 5,048,675 dated 6 Feb. 1991, with a priority of the German utility model 90 165 86 (Mühlen Sohn GmbH) dated Jun. 12, 1990.

Such patents illustrate the state of the basic art relating to clawed junction staples, which are subsequently called "generation I" staples. As shown in the figures, these are individual staples having the shape of an open U, made of wire, each including two bent points, which are positioned by braced on the end of a conveyor belt, with the bottom of the U overlapping such end to form, with the other staples of the series, a series of links which can be interleaved with other links positioned on the other end of the conveyor belt. Such documents clearly show that, in order to avoid a conflict between the lower claw and the upper claw of the same staple, either the shape of the claws is modified (last patent mentioned above), or the length of the upper and lower branches of the same staple is modified. The first patent mentioned above alternately uses a short and a long staple and so on. This demonstrate that, for a very long time, as from the generation I staples, industrialists had thought of the necessity to avoid as much as possible tearing the end of the conveyor belt by longitudinally distributing the points of the individual claws, in order to avoid a "dotted" effect.

One improvement consisted in joining such individual staples with a continuous bar connecting the upper claws which were shifted with respect to the lower claws, which were running on from the links, with the upper claws being positioned on either side of the longitudinal axis of the chain links which is the same as that of the lower claws. To make such staples, these were cut in a sheet metal strip or strap. Such staples are also called subsequently generation II staples.

The publication of the patent application EP 0 752 542 A1 (Sülzle) added to generation II staples bars connecting two lower clamps. However such (generation II) staple belts had several drawbacks:

the continuous bar connecting the upper staples made the device rigid widthways of the belt, the number of claws per link was only two, which did not enable a secure anchoring on the links in the presence of strong punctual or even more extended tractions.

The present invention aims at providing a junction device for a conveyor belt using series of a new kind of staples provided with flexible properties, while securing the anchoring of the links at the edges of the conveyor belt ends thanks to a geometry which authorizes the use of a much greater number of claws per link, which results in a fastening creating solidarity between the links and the device being thus capable of resisting more important tractions affecting the conveyor belt and thus the junction without any damage for the ends of the conveyor belt. This object is reached using a junction device for conveyor belts composed of a first series of chain links or lugs liable to be fastened on one of the ends of a conveyor belt, and of a second series of chain links or lugs liable to be fastened on the other end of said conveyor belt, with the links of both series being fastened to the respective ends of the conveyor belt so as to protrude with respect to such ends, both series of links being able to be assembled in an articulated way using a connecting and articulation rod successively fitted into a chain link of the first series, then into a chain link of the second series and so on, the chain links of both series being fastened to the respective ends of the conveyor belt having been previously interleaved by bringing together the two ends of the conveyor belt, characterized in that in each one of the two series of chain links, the chain links are connected to fastening plates, the upper branch of a first chain link being connected to an upper plate and the upper branch of a second chain link, adjacent to the first chain link being connected to said upper plate, the lower plate of said second chain link being connected to a lower plate, the lower branch of a third chain link adjacent to the second chain link being connected to said lower plate and so on, forming a meander-like disposition liable to receive, between the upper and lower plates, one end of a conveyor belt with the upper and respectively lower plates being provided with claws or hooks, the points of which are globally oriented downwards as regards the upper plates and globally upwards as regards the lower plates, such claws being positioned on one edge or on edges of the plates and/or inside the surface of the plates.

Another object of the present invention is to facilitate the positioning of the series of the staples according to the invention by integrating a means for blocking the series of staples along the end of the conveyor belt. This aim is reached thanks to stops, the manufacturing of which is easy thanks to the geometry of the invention, with the plates including stops, each being made of a sheet metal piece cut at the same time as the other elements, chain links, plates and claws, this piece of sheet metal being connected to the plate by a folding line and a protruding approximately at right angles with respect to the plane of the plate, in the space located between the upper and the lower plates, where the end of the conveyor belt must be inserted, with the folding line being located at the rear of the chain links, at the place where the front edge of the conveyor belt end must be located.

BRIEF DESCRIPTION OF THE DRAWINGS

Other advantageous characteristics provided by the present invention are also described in relation with embodiments described hereinafter, and with respect to the drawing wherein.

DETAILED DESCRIPTION

Figure 1:
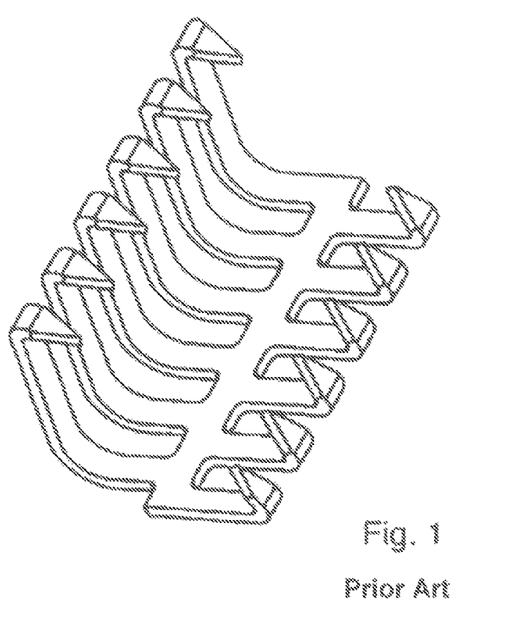
FIG. 1 is a perspective view of a series of generation II staples.

As can be seen in FIG. 1 which is a perspective view of a series of staples of the prior art (generation II), such series is composed of a continuous bar bearing claws, the assembly looking like a comb, the handle (the bar) of which would bear fastening claws on both sides of the handle. On the lower side (in the drawing) long branches can be seen which are ended by a claw, which are intended to form links between the continuous bar and the claws at the end of such long branches after the folding into a U shape. On the other side of the continuous bar (upper side in the drawing), shorter branches, the ends of which form claws, are positioned and slightly shifted longitudinally with respect to the bar. It should be understood that, after the introduction of one conveyor belt end and the bracing of the upper claws and the lower claws against the faces of the conveyor belt end, the claws go into the thickness of the conveyor belt while fixing the series of staples and while leaving links protruding with respect to the conveyor belt end. The shift between the matching lower claws and the upper claws is provided to prevent the claws from catching the conveyor belt on the same longitudinal line of the conveyor belt with a view to prevent, upon the operation of the conveyor belt, tractions from exerting on the same line with an increased risk of the conveyor belt end tearing.

Figure 2:
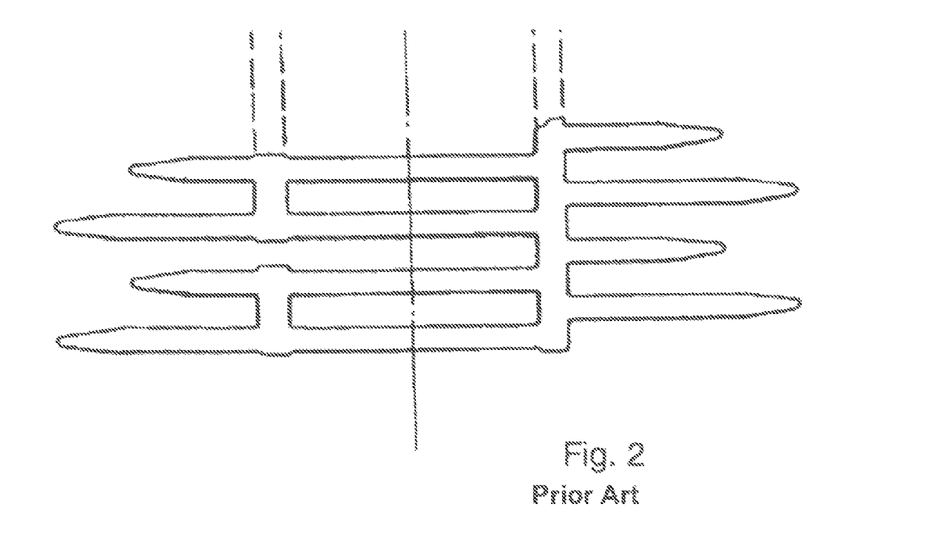
FIG. 2 is a plan view of the cutting blank of the staples according to the publication of an application for a European patent EP 0 752 542 A1.

FIG. 2 shows the flatbed die cutting of another series of prior part junction staples of the same type as the one in FIG. 1 (generation II). It should be noted that, in order to prevent deviations of the long lower claws when positioning the staples, a bar connecting such claws two by two has been provided for (publication of the application for a patent EP 0 752 542 A1).

Figure 3:
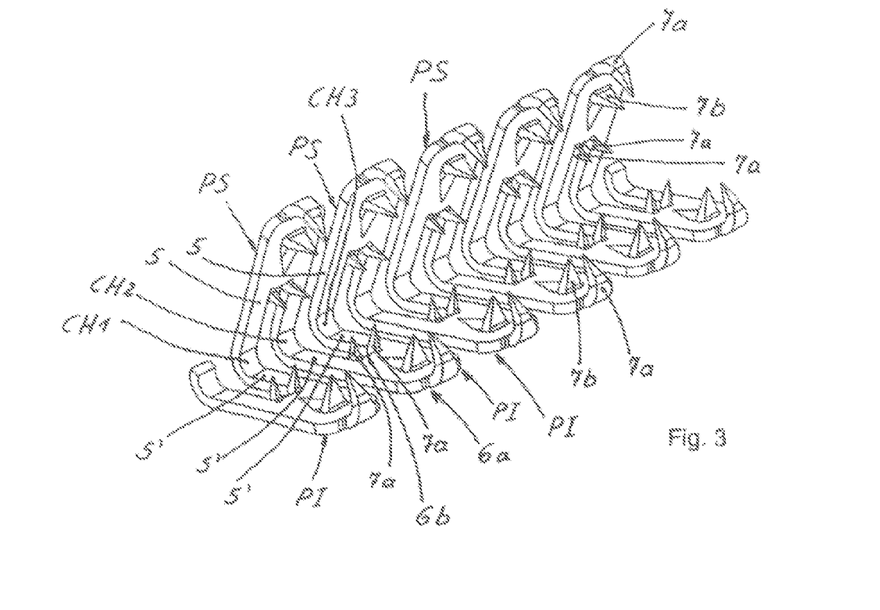
FIG. 3 is a perspective view of a first embodiment of staples according to the invention.

FIG. 3 shows the embodiment of a series of staples according to the present invention in a perspective view. The chain links CH1, 2, 3, the upper branches 5, the lower branches 5', the lower plates PI, the upper plates PS should be noted. As mentioned above, the chain links are connected to fastening plates with the upper branch 5 of a first chain link CH1 being connected to an upper plate PS and the upper branch 5 of the second chain link CH2, adjacent to the first chain link CH1 being connected to said upper plate PS, the lower branch 5' of said second chain link CH2 being connected to a lower plate PI, the lower branch 5' of a third chain link CH3, adjacent to the second chain link, being connected to a lower plate PI, the lower branch 5' of a third chain link CH3, adjacent to the second chain link, being connected to said lower plate PI and so on, by forming a meander-like disposition liable to receive, between the upper PS and the lower PI plates, the end of a belt conveyor.

The upper plates include globally oriented downwards claws, with claws 7a being at the rear edge 6a of the plates and at the front edge 6b of the plates. The lower plates also include globally oriented upwards claws, with claws 7a being positioned at the rear edge 6a of the plates and at the front edge 6b of the plates. Other claws 7b are positioned inside the surface of the upper plates and that of the lower plates. All the claws are obtained by a cutting at the same time as the cutting of chain links and the plates, and folded along the appropriate direction. It should be understood that other claws dispositions than those on FIG. 3 are possible, some of which appear on the following drawings showing the preferred embodiments.

Figure 4:
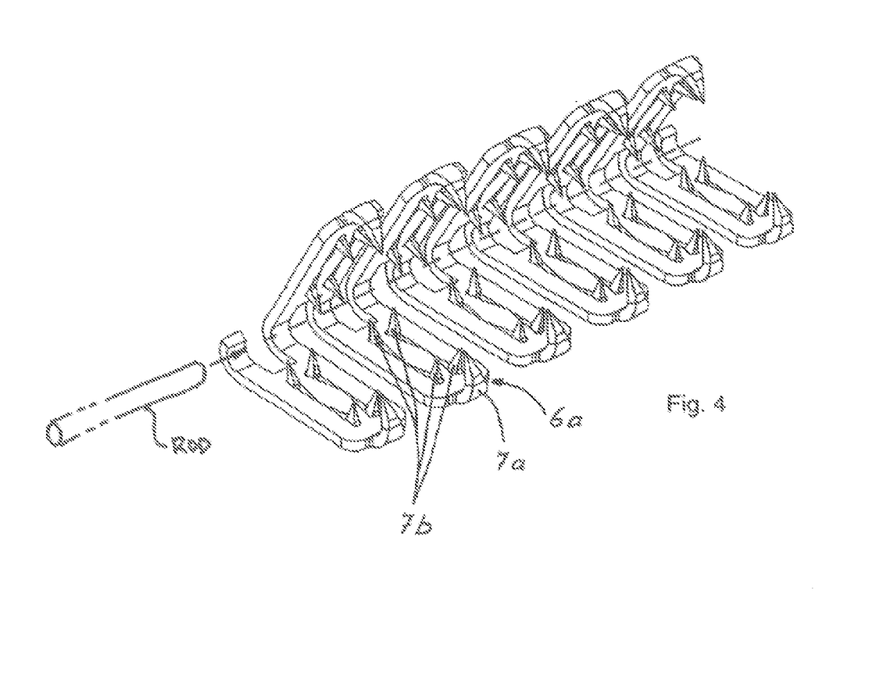
FIG. 4 is a perspective view of a second embodiment of staples according to the invention.
Figure 5:
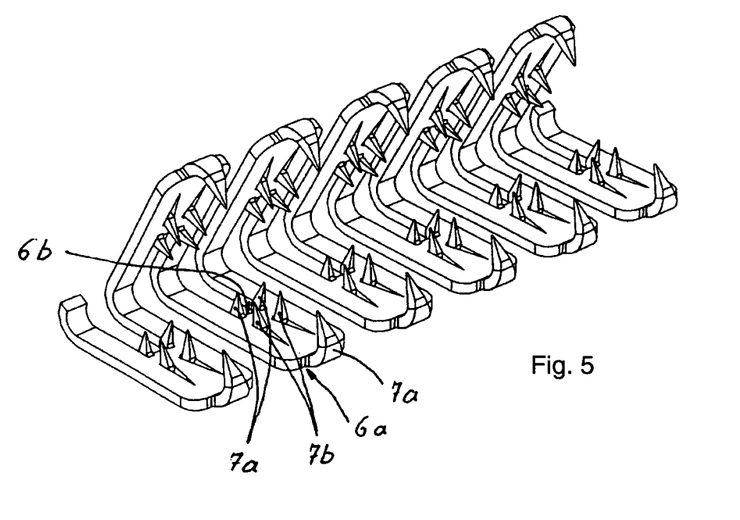
FIG. 5 is a perspective view of a third embodiment of staples according to the invention.
Figure 6:
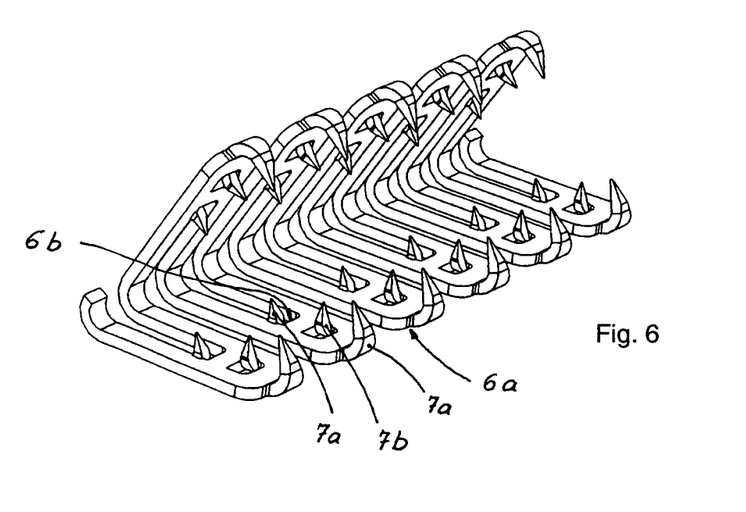
FIG. 6 is a perspective view of a fourth embodiment of staples according to the invention.

FIG. 4 shows plates according to the invention including five claws (1 claw 7a at the rear edge 6a of the plates and 4 claws 7b inside the surface of the plates). FIG. 5 shows plates according to the invention also including five claws (1 claw 7a at the rear edge 6a of the plates, 2 claws 7a at the front edge 6b of the plates and 2 claws 7b inside the surface of the plate). FIG. 6 shows the plates according to the invention including three claws (1 claw 7a at the rear edge 6a of the plates, 1 claw 7a at the front edge 6b of the plates and 1 claw 7b inside the surface of the plate). It is clearly evident that the geometry according to the invention enables numerous positions of the claws which are different from the ones shown, while remaining within the scope of the invention. This is a significant advantage since it is then possible to manufacture series of staples according to the invention which are adapted to the various types of conveyor belts, the structure, the thickness and the component thereof.

Figure 7:
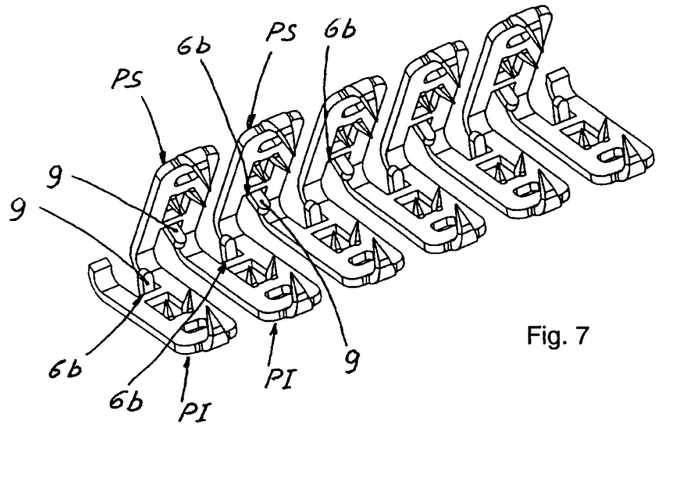
FIG. 7 is a perspective view of a fifth embodiment of staples according to the invention.
Figure 8:
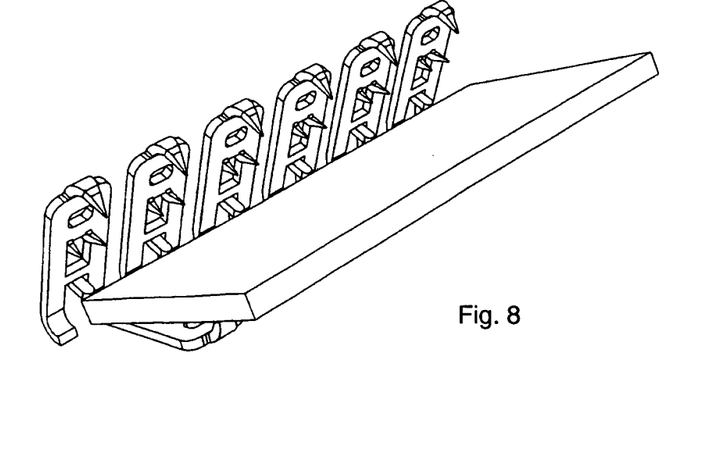
FIG. 8 is a perspective view of the fifth embodiment of staples with the end of the conveyor belt being engaged.
Figure 9:
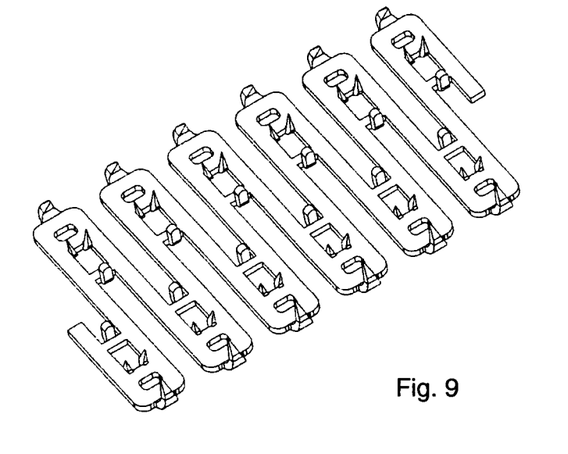
FIG. 9 is a view of the embodiment of FIGS. 7 and 8, a plan view during the phase of the initial cutting prior to the folding operations.
Figure 10:
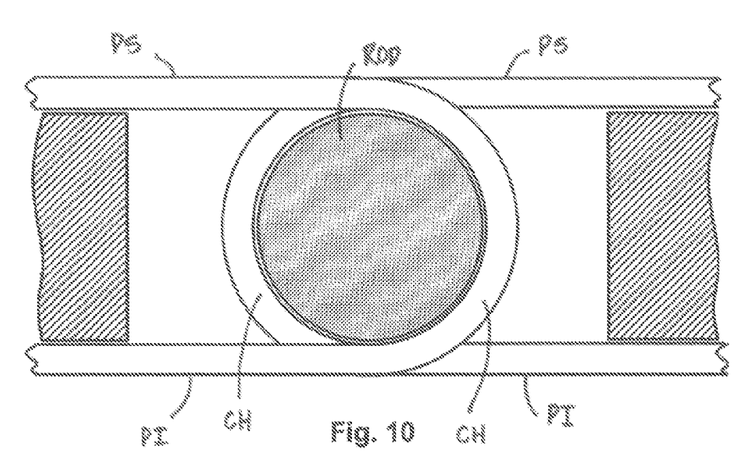
FIG. 10 is a side view of an embodiment of staples and associated articulation rod.

FIG. 7 shows another embodiment of the series of staples according to the invention. Such staples include stops 9 positioned at the front edge 6b of the lower plates PI. Such stops consist in cuts initially overlapping the front edge 6b of the lower plates, which are then folded upwards along a folding line aligned with the front edge 6b of the lower plates PI and respectively the upper plates. An analogous arrangement exists in the upper plates. Then, it should be understood that, during the positioning of the series of flexible staples according to the invention, such stops enable a perfect blocking chain link per chain link against the end of the conveyor belt. The positioning of the stops can be only on the upper plates or only on the lower plates. However, such positioning would make the upper plates different from the lower plates, which would not facilitate the positioning thereof, thus making the operators taking into account the presence or the absence of stops on some plates, whereas the staples can be positioned without any risk of mistake on all the plates when using stops.

The series of staples according to the invention, which thus are positioned and blocked astride on the ends of the conveyor belts, can easily be closed and fastened using a hammer or pneumatic, hydraulic or electric tools known in the art. Although the claws 7a and 7b can be positioned as desired, it is advantageous not to position two claws or more in a longitudinal alignment in the plates, with the longitudinal alignment being an alignment according to a line parallel to the longitudinal direction of the plates, whatever the dimensions of the plates, as being that of the branches of the chain links, which is also the travel direction of the conveyor belt on which the staples of the junction device according to the invention must be mounted. It can also be advantageous to position the claws in each plate, in the surface left free by the geometric projections of the two plates located on the left and on the right, on the opposite side of the staples. With such a position, when the staples are placed, the tips of the claws can be folded more easily, taking advantage of the temporary penetration of the plates into the elastic material of the conveyor belt using the tool.

As shown by the preceding description and FIGS. 3-10, the present invention has several significant advantages, from an industrial point of view, as compared with the clawed staples of the prior art:

it makes it possible to choose the utilization of a significantly greater number of claws per link, which is a significant improvement of the anchoring of the chain links, the utilization of plates makes it possible to position the claws on the edges of the plates as well as inside the surfaces thereof, the alternate fastening from above and from under and so on which is made possible by the meander-like disposition makes it a perfectly balanced fastening of the chain links, the absence of a continuous connecting bar give a useful flexibility, widthways of the conveying belt. Thus, a incidental or desired turning up of the conveyor belt is possible without risks of rupture, which was not the case with the chain links of the prior art which were connected by a continuous bar.

The invention claimed is:

1. A junction device for conveyor belts comprising:
   a first series of chain links fastened on one end of a conveyor belt;
   a second series of chain links fastened on the other end of the conveyor belt, with the first and second chain links of both first and second series being fastened to the respective ends of the conveyor belt so as to protrude with respect to such ends, the first and second series of chain links being able to be brought together in an articulated way using a connecting and articulation rod, the chain links of the first series of chain links and in the chain links of the second series of chain links being disposed alternatively and successively along said articulation rod, with the chain links of both series of chain links fastened to the respective ends of the conveyor belt having been pre-interleaved by bringing together the two conveyor belt ends;
   claws;
   in each one of the first and second series of chain links, the chain links are connected to plates, said plates having upper plates to be disposed above the conveyor belt and lower plates to be disposed under the conveyor belt with an upper branch of a first chain link being connected to an upper plate and an upper branch of a second chain link, adjacent to the first chain link, being connected to said upper plate; and
   a lower branch of the second chain link being connected to a lower plate, a lower branch of a third chain link, adjacent to the second chain link, being connected to said lower plate, such a disposition with the first, the second and the third chain links, being repeated along the articulation rod throughout the remaining chain links of each first and second series of chain links, said disposition allowing to receive between the upper and lower plates one end of the conveyor belt, with the upper and respective lower plates being provided with claws or hooks, the tips of which are globally oriented downwards as regards the upper plates and globally upwards as regards the lower plates, such claws being positioned on at least one edge of the plates, and/or inside the surface of the plates.

2. A junction device according to claim 1, wherein the chain links, the plates and the claws are cut in the same strip of sheet metal and are in one piece.

3. A junction device according to claim 1, wherein the claws of the plates, whether these are claws positioned on the edges of the plates or claws positioned inside the surface of the plates, are so positioned that no claw is longitudinally aligned with another claw.

4. A junction device according to claim 1, wherein the claws of each plate are positioned in the surface left free by the geometrical projection of the two plates located on the left and on the right on the opposite side of the staples.

5. A junction device according to claim 1, wherein the plates include stops, each including a piece of sheet metal cut at the same time as the other elements, chain links, plates and claws, with this piece of sheet metal being connected to the plate by a folding line and approximately protruding at right angles into the space located between the upper and lower plates where the end of the conveyor belt must be inserted, with the folding line being located at the front edge of the plates.

6. A junction device according to claim 5, wherein the stops are provided only on the upper plates or only on the lower plates).

7. A junction device for conveyor belts comprising:
   a first series of chain links fastenable on a first end of the conveyor belt and protruding from said conveyor belt, each of said first series of chain links having an upper branch section and a lower branch section;
   a second series of chain links fastenable on said second end of the conveyor belt and protruding from said conveyor belt, each of said second series of chain links having an upper branch section and a lower branch section;
   said first and second series of chain links being connectable together in an articulated manner via a connecting and articulation rod, each of said chain links of said first series of chain links being disposed alternatively and successively with each of said chain links of said second series of chain links in an interleaved manner along the articulation rod;
   a plurality of upper plates positionable along a first surface of the conveyor belt and a plurality of lower plates positionable along an opposing second surface of the conveyor belt, said plurality of upper plates and said plurality of lower plates capable of receiving the conveyor belt therebetween; and
   claws or hooks extending from at least one of said plurality of upper plates and at least one of said plurality of lower plates toward the conveyor belt,
   wherein said upper branch section of a first chain link of said first series of chain links is connected to a first upper plate of said plurality of upper plates, said upper branch section of a second chain link of said first series of chain links is positioned adjacent to said first chain link and further connected to said first upper plate of said plurality of upper plates, said lower branch section of said second chain link of said first series of chain links is connected to a first lower plate of said plurality of lower plates, and said lower branch section of a third chain link of said first series of chain links is positioned adjacent to said second chain link and further connected to said first lower plate of said plurality of lower plates, such orientation of said first chain link, said second chain link, and said third chain link being repeated for remainder of said first series of chain links and said second series of chain links.

8. A junction device according to claim 7, wherein said first series of chain links, said second series of chain links, said plurality of upper plates, said plurality of lower plates, said claws or hooks are formed as a unitary member.

9. A junction device according to claim 7, wherein said claws or hooks are oriented such that a first of said claws or hooks is not longitudinally aligned with a second of said claws or hooks.

10. A junction device according to claim 7, wherein said claws or hooks of said first upper plate are offset relative to outer edges of said first lower plate.

11. A junction device according to claim 7, further comprising:
    stops extending from and unitarily formed with at least one of said plurality of upper plates and at least one of said plurality of lower plates toward the conveyor belt, said stops being generally oriented at an orthogonal angle relative to the conveyor belt and generally adjacent an edge of the conveyor belt.

12. A junction device according to claim 7, further comprising:
    stops extending from and unitarily formed with at least one of said plurality of upper plates, said stops being generally oriented at an orthogonal angle relative to the conveyor belt and generally adjacent an edge of the conveyor belt.

13. A junction device according to claim 7, further comprising:
    stops extending from and unitarily formed with at least one of said plurality of lower plates, said stops being generally oriented at an orthogonal angle relative to the conveyor belt and generally adjacent an edge of the conveyor belt.

* * * * *